(12) United States Patent
Purton

(10) Patent No.: US 6,659,875 B2
(45) Date of Patent: Dec. 9, 2003

(54) IDENTIFICATION TOKEN

(75) Inventor: William Westmore Purton, Heidelberg West (AU)

(73) Assignee: Dolphin Advanced Technologies Pty Ltd., Victoria (AU)

( * ) Notice: Subject to any disclaimer, the term of this patent is extended or adjusted under 35 U.S.C. 154(b) by 167 days.

(21) Appl. No.: 09/902,725

(22) Filed: Jul. 12, 2001

(65) Prior Publication Data

US 2002/0006829 A1 Jan. 17, 2002

(30) Foreign Application Priority Data

Jul. 13, 2000 (AU) ............................................. PQ 8734

(51) Int. Cl.⁷ .............................................. G06F 19/00
(52) U.S. Cl. ....................................................... 463/47
(58) Field of Search .............................. 463/47, 29, 25; 273/148 R, 288, 309; 194/214; 235/492

(56) References Cited

U.S. PATENT DOCUMENTS

| | | | | |
|---|---|---|---|---|
| 5,166,502 A | * | 11/1992 | Rendleman et al. | 235/492 |
| 5,406,264 A | * | 4/1995 | Plonsky et al. | 340/572 |
| 5,706,925 A | * | 1/1998 | Orus et al. | 194/214 |
| 5,895,321 A | * | 4/1999 | Gassies et al. | 463/29 |
| 6,021,949 A | * | 2/2000 | Boiron | 235/492 |
| 6,164,551 A | * | 12/2000 | Altwasser | 235/492 |
| 6,296,190 B1 | * | 10/2001 | Rendleman | 235/492 |

FOREIGN PATENT DOCUMENTS

| | | | |
|---|---|---|---|
| DE | 19512878 | * | 11/1995 |
| JP | 2001-167240 | * | 6/2001 |
| JP | 2001-351154 | * | 12/2001 |

* cited by examiner

Primary Examiner—John A. Jeffery
(74) Attorney, Agent, or Firm—Connolly Bove Lodge & Hutz LLP

(57) ABSTRACT

An identification token 5 is provided with a read/write electronic chip 8 and antenna 10 located beneath a label 9. The chip operates in the 12–15 MHz frequency range. The identification token is easy to fabricate and requires less power to operate. It has application as a gaming token for a casino environment or a medallion for use in monitoring patrons at sporting venues

4 Claims, 1 Drawing Sheet

IDENTIFICATION TOKEN

FIELD OF THE INVENTION

This invention relates to an improved identification token such as a gaming chip of the kind used in casinos or a medalion used for entry to public venues such as sporting arenas. In particular it is directed to a new construction of token and a method of making it.

BACKGROUND TO THE INVENTION

Gaming chips with transponders capable of carrying data that can be read and updated from a remote controller are known from U.S. Pat. Nos. 5,651,548 and 5,735,742. A viable system of this type has yet to be implemented. The concept is to have a gaming chip that is identifiable and can be tracked as it moves around the casino. The transponder is adapted to be read and written to so that the identification data can be updated.

Australian patents 699025 and 700269 disclose gaming chip constructions in which an electronic device is embedded in a cell or recess around which the gaming token is moulded. These designs require special moulding operations and expensive tooling in order to accommodate and protect the chip. The electronic chips currently proposed for use in plastic gaming chips operate at a frequency of 100–200 KHz and require copper antennae that are large in comparison to the electronic chips.

It is an object of this invention to provide a simple alternative for incorporating an electronic chip into a token or gaming chip.

BRIEF DESCRIPTION OF THE INVENTION

To this end the present invention provides an identification token having a label recess in at least one surface thereof and a label adhered to the token within said recess the improvement comprising the provision of an electronic identification and data device between said label and the surface of said token recess. This invention is predicated on the discovery that the combination of a label overlying an electronic chip is robust enough to allow the electronic chip to function within the environment of a gaming casino or sports stadium. The electronic device is preferably an electronic chip suitable to retain unique identification data and a history of transactions. It may be of the type disclosed in U.S. Pat. No. 5,651,548 which is readable at locations within a casino and capable of sending and receiving data. Usually an antenna will also be needed and this is attached to the electronic chip.

Throughout this specification the term identification token is intended to include a gaming token or chip as used in a casino or a badge medallion or tag used in a similar fashion to a ticket to identify patrons at sporting venues etc. At events like Soccer matches crowd control and security can be assisted if patrons can be identified readily by wireless identification.

Thus in another aspect this invention provides an identification token which includes a) a body portion having at least one surface
b) a recess in said one surface
c) a label adapted to seat within said recess
d) an antenna printed or adhered to said label or said recess
e) an electronic identification and data device adhered to said label or said recess and connected to said antenna In further aspect this invention provides an identification token with a data device adapted to transmit and receive data in a high frequency radio range embedded within or attached to the identification token.

This second aspect of he invention is predicated on the discovery that electronic chips operable in the 12–15 MHz range require smaller antenna and less power to operate. They can also be made to be robust enough for the moulding operations necessary to form the gaming chip. To some extent the robustness of the electronic chip depends on the substrate to which it is fixed. This can assist in protecting the electronic chip from damage during the moulding of the identification token.

The electronic chip may be adhered to the under surface of the label. The antenna may also be adhered to the undersurface of the label or alternatively the antenna can be printed onto the undersurface of the label using appropriately conductive inks or stamped foils. The label is then adhered to the identification token in the conventional way.

In another embodiment the electronic chip is adhered or stamped into the surface of the identification token prior to being covered by the label. The antenna may be attached to the electronic chip or printed on using conductive ink or stamped foils. The label is then adhered to the identification token in the usual way. It is not essential for the electronic chip and antenna to be on the same surface. One may be on the token surface and the other on the under surface of the label as long as electrical contact is established after the label is adhered to the identification token.

BRIEF DESCRIPTION OF THE FIGURES

A preferred embodiment of the invention will now be described with reference to the drawings in which.

DETAILED DESCRIPTION OF THE INVENTION

Figure 1:
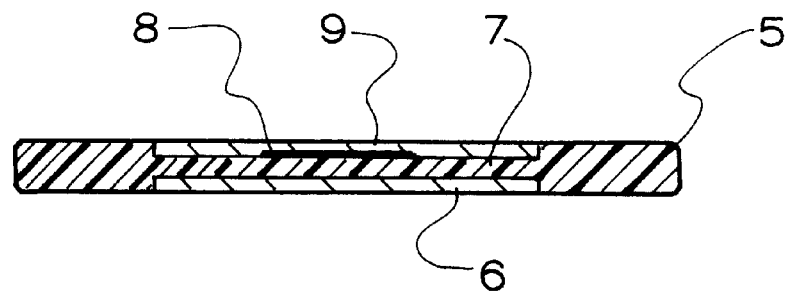
FIG. 1 is a sectional view of the identification token of this invention.
Figure 2:
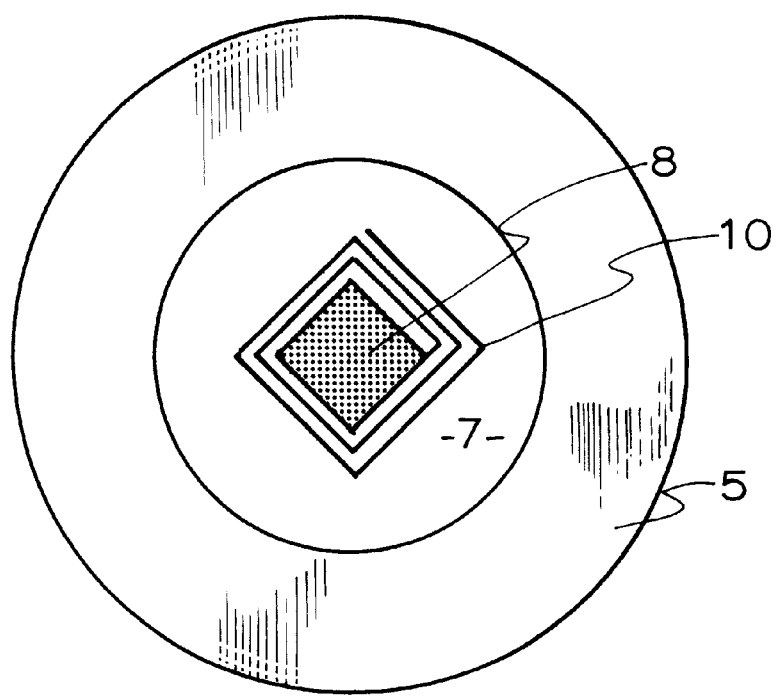
FIG. 2 is plan view of the identification token before the label is applied.

The identification token 5 is composed of an injection moldable synthetic polymer and has a shallow recess 7 in its surface to accommodate labels 6 and 9. In this embodiment the token is a gaming chip of the kind used in casinos. The electronic identification device 8 is a read/write chip operable at 13.56 MHz. It consists of a power supply, a transmitting and receiving system, a data processing unit and a memory block all adhered to a suitable substrate. The selected frequency range means that the speed of communication between the chip and the casino monitoring system is faster than chips which operate in the KHz frequency range. Also this high frequency chip uses less power and can utilise a smaller antenna than chips which rely on KHz frequencies. This electronic chip has connected to it an aerial 10. In the embodiment illustrated the chip 8 is lightly adhered to the gaming chip 5 in recess 7 and the antenna 10 is printed onto the surface of recess 7 using conductive ink. The label 9 is adhered to the gaming chip to cover the recess 7 and secure the chip 8 and antenna 10. Alternatively the antenna 10 can be printed onto the undersurface of the label 9 and the electronic chip 8 lightly adhered also. The label 9 is then adhered with epoxy resin or other suitable adhesive in the recess 7.

The electronic chip 8 in the finished gaming token can be read from a distance of up to 20 metres. The memory block is a block of non volatile memory which stores information in a permanent form or in an erasable form. The size of the memory and the processor will be determined by the level of information to be stored and processed by the identification device. The receiver circuitry preferably converts received signals into digital impulses which can be deciphered by the processor that executes commands received and/or inserts or retrieves information stored in the memory block.

Within a casino environment, antennas for addressing the chips (readers) are placed at convenient locations to read and or transmit data to the chips. The readers are conveniently located under the playing surface and are designed to read a stack of up to 25 gaming chips standing 75 mm high as well as the number of stacks that can be accommodated on the playing surface.

When the reader emits a signal to excite the electronic chips individual chips 8 are programmed to respond at different intervals to avoid the incident of collision between the electromagnetic fields generated by the signals which would interfere with clear communication between each chip and the reader. Jamming caused in this way is further reduced by a combination of chip architecture, firm ware, and the software which drives the reader and the chip. Each chip 8 has a unique encrypted serial number or identification assigned at the time of manufacture. When a chip 8 responds to a reader it is identified and its location is stored and tracked by the casino's central processing system. The chip 8 is also capable of receiving information from the reader.

A casino can use the information derived from the location of the chip for some or all of the following:

Security—to detect forgeries by continuously interrogating chips that are in play to ensure that only chips registered for use within the casino are in play.

Player tracking—keeping a record of player transactions and consequently analysing patterns of play.

Auditing—the continuous recording and analysis of the casino's cash flows by table, by type of game is possible which also makes possible the production of immediate profit/loss figures.

The identification token can also be used to identify persons if it is formed as a medallion or brooch that can be attached to a person. It is particular use in sporting venues where it can be used to Identify the date and place of issue and/or the date and place of the event The seat location allocated to the wearer The identification of the wearer The location of the token at a sports venue to check that the token is in an allocated area Any other desired information.

From the above it can be seen that the present invention provides a simple and inexpensive alternative to the trackable gaming chips currently proposed.

What is claimed is:

1. An identification token comprising:
    a body portion having at least one surface;
    a recess formed in said surface;
    a label adapted to seat op a surface within said recess;
    an antenna selectively printed on or adhered to said label or said surface within said recess;
    an electronic identification and data device selectively adhered to said label or said surface within said recess and connected to said antenna;
    whereby the electronic identification and data device lies directly between said label and said surface within said recess.

2. An identification token as claimed in claim 1 wherein the electronic identification and data device receives and transmits data in the frequency range 12–15 MHz.

3. An identification token comprising:
    a label recess formed in at least one surface of the token;
    a label adhered to the token within said recess; and
    an electronic identification and data device sandwiched directly between said label and the surface of said label recess.

4. The identification token as claimed in claim 3, wherein the data device transmits and receives data in the frequency range 12–15 MHZ.

* * * * *